Anthony T. Logus INVENTOR

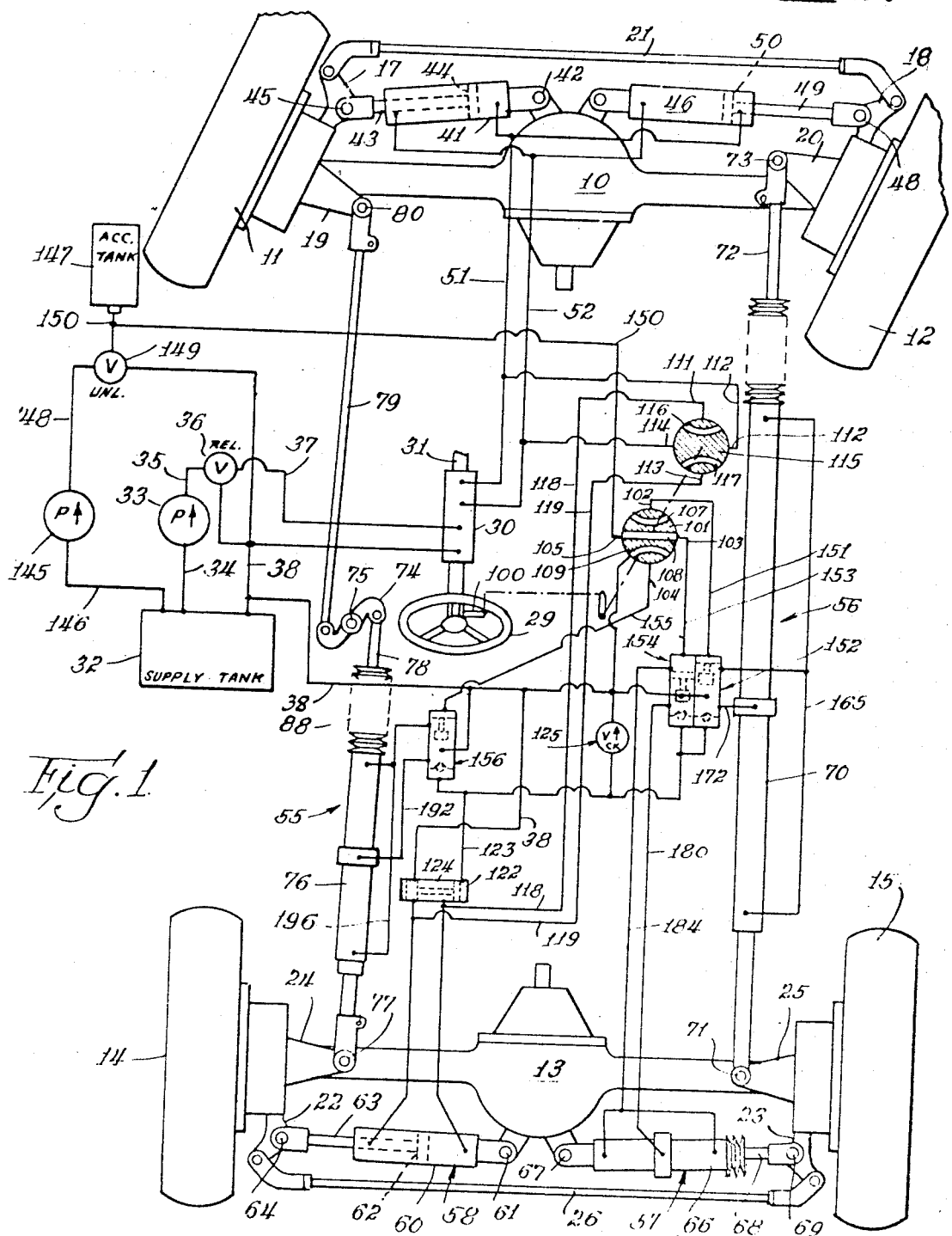

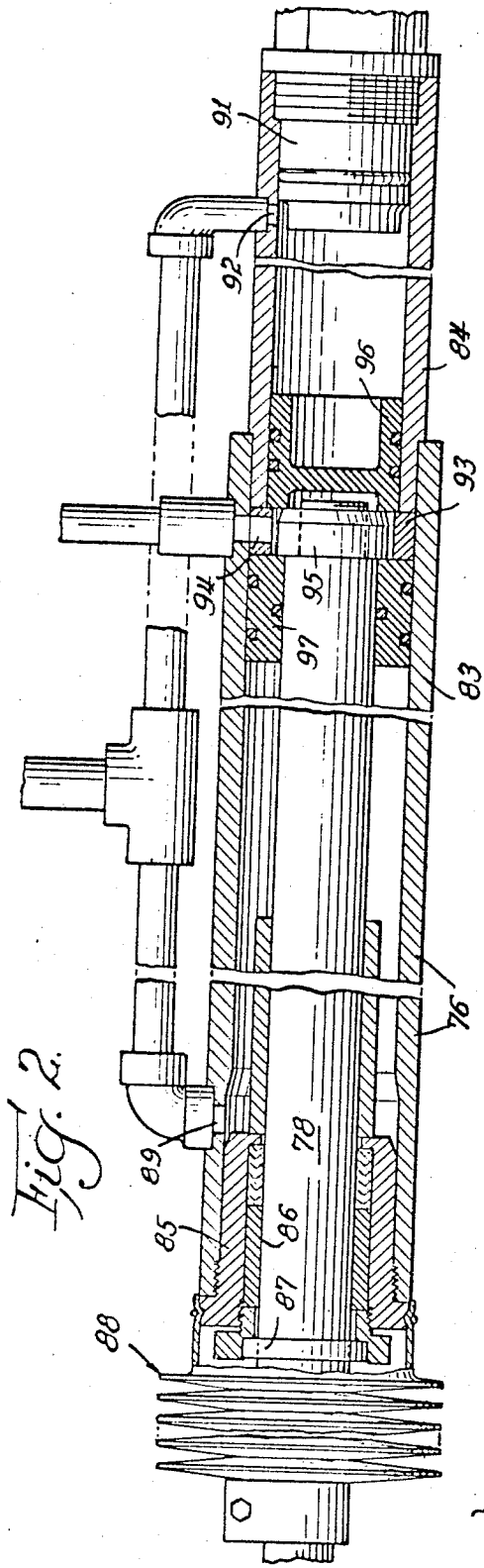

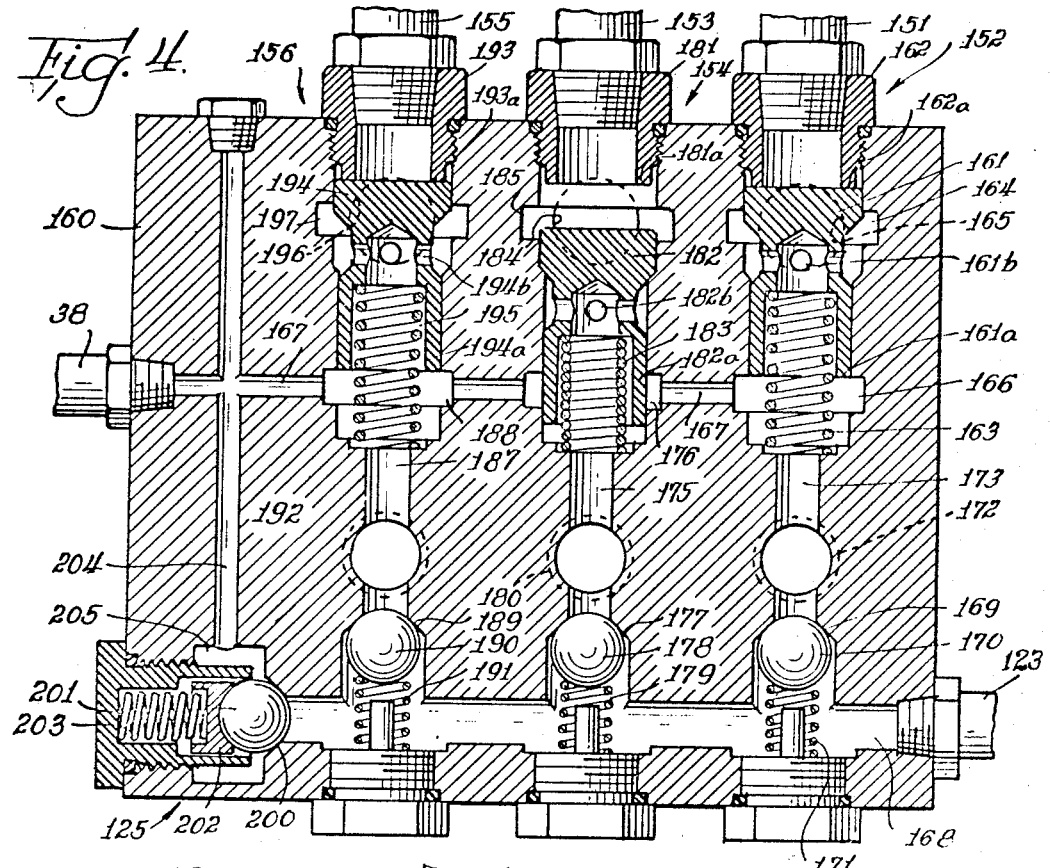
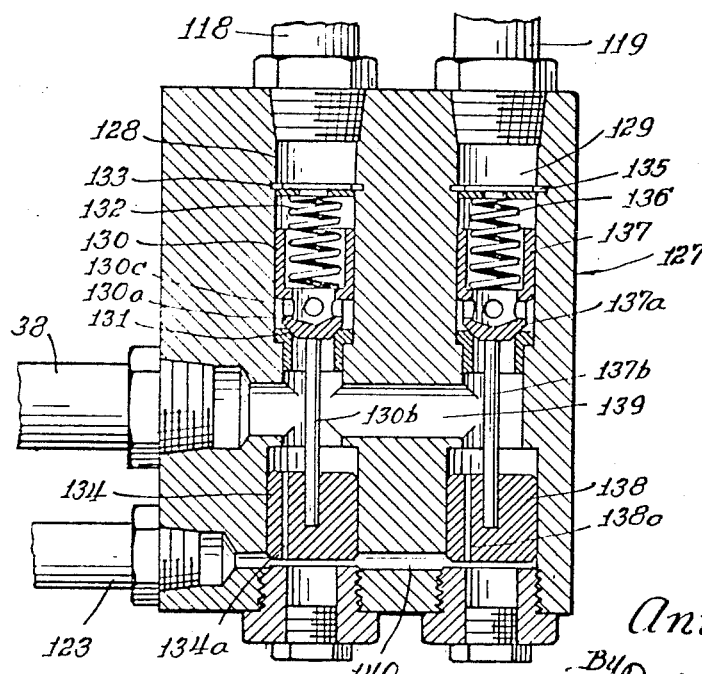

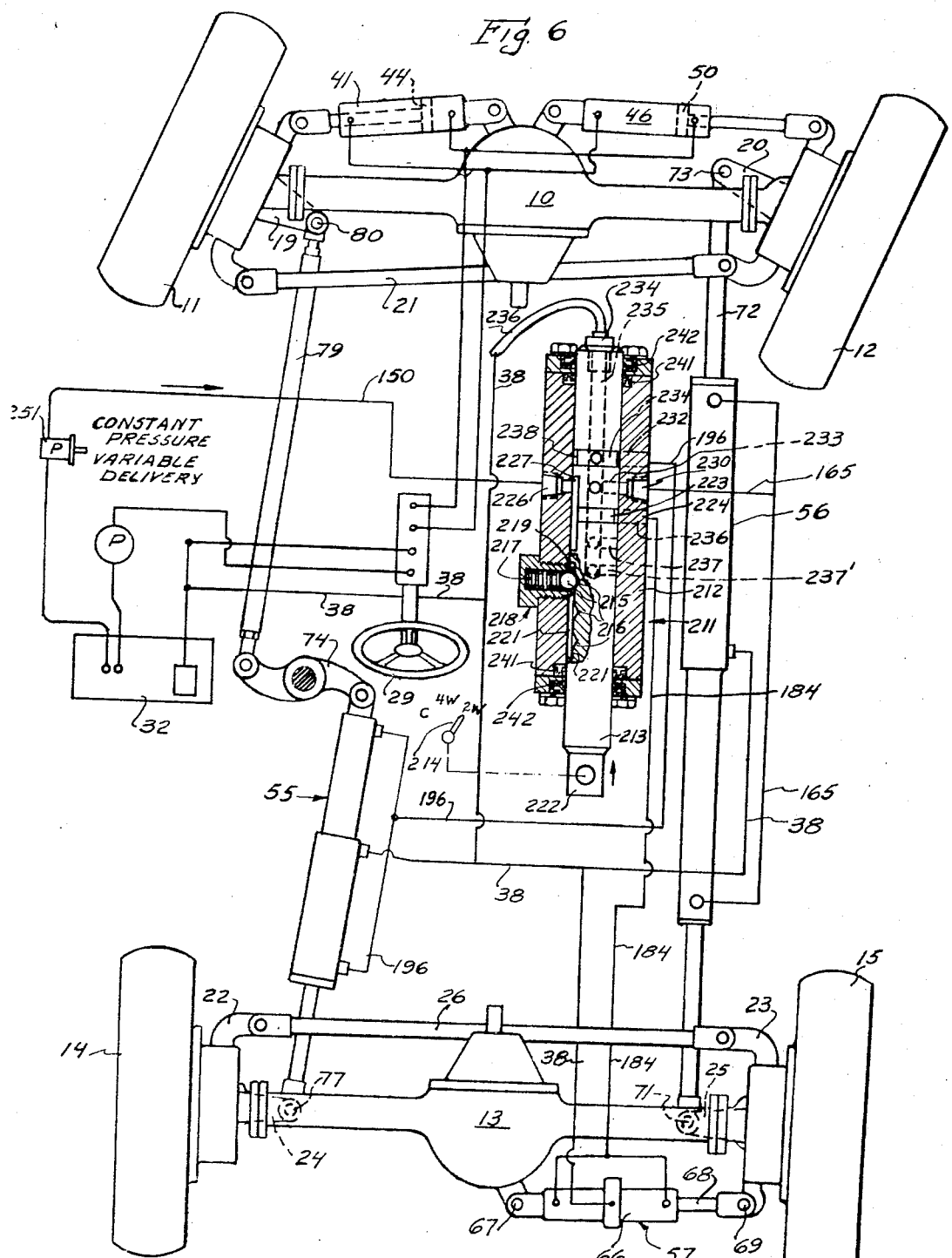

BY

Darbo, Robertson & Vandenburgh

United States Patent Office 3,446,307
Patented May 27, 1969

3,446,307
SELECTIVE STEERING WITH SINGLE VALVE
Anthony T. Logus, Chicago, Ill., assignor to Pettibone Mulliken Corporation, a corporation of Delaware
Continuation-in-part of application Ser. No. 484,019, Aug. 31, 1965. This application Feb. 13, 1967, Ser. No. 615,429
Int. Cl. B62d 5/06; F01b 13/00
U.S. Cl. 180—79.2                                  30 Claims

ABSTRACT OF THE DISCLOSURE

By turning a lever the driver of the vehicle may select between ordinary two-wheel steering, ordinary four-wheel steering, or four-wheel crab steering. The driver's selection lever selects which one of three tracking-rod or tie-rod assemblies will be made effective to control the coupled rear wheels. Each tie rod includes a lock cylinder having a mid-point abutment, with pistons on each side thereof. When hydraulic pressure fluid is applied to both ends of the cylinder, both pistons are forced against the abutment thereby drawing that tie rod to the proper length and locking it at that length. Other disclosure, including control valves, is included. Some control valves, one of rotary type, connect one lock cylinder to a pressure source while connecting the others to tank.

---

This application is a continuation-in-part of applicant's application Ser. No. 484,019 filed Aug. 31, 1965 now abandoned.

This invention relates to selective steering systems. In its preferred forms, of which applicant offers this disclosure in the event adequate patent protection is granted, the driver of the vehicle has ready choice between conventional two-wheel steering, conventional four-wheel steering, or four-wheel "crab" steering.

Yard vehicles, such as fork-lift trucks, and many rough-terrain work vehicles represent the classes of vehicles for which the selective steering of this invention is especially valuable. In storage yards, the amount of unoccupied ground space often is limited. Stacks of material, including the material to be handled by such a vehicle, may drastically reduce the maneuvering room for such vehicles. With conventional two-wheel steering, it may be very difficult to negotiate a necessary turn, as from one aisle to a cross-aisle. By going to normal four-wheel steering the turning radius is greatly reduced so that negotiating the same turn may become quite easy. At other times, it may be difficult or impossible to place the vehicle in a desired position except by "crab" steering. In this steering, all four wheels are turned toward the same side of the vehicle and are approximately parallel with one another. As the vehicle is moved, both ends move to the same side, without change in the angular disposition of the vehicle. It might, for example, be necessary to have the vehicle disposed parallel to a wall and close to it, working between two stacks of material. Normal two or four-wheel steering might get the vehicle fairly close to the position desired, but if the vehicle is two or three feet too far from the wall, although parallel to it, it is far easier to move the vehicle to the desired position by "crab" steering.

The element of time in moving the vehicle to the desired position is often extremely important. In industrial situations, time represents money in the operator's time, the machine time and in getting the job done. In military situations, as in servicing or loading implements of war, time can conceivably mean the difference between victory and defeat. Accordingly, military specifications may require that choice of the three steering methods be provided.

Inasmuch as almost everyone is accustomed to two-wheel steering, there tends to be an element of danger in other types of steering which makes two-wheel steering desirable where there is no need for four-wheel steering. With normal four-wheel steering, turning the steering wheel causes the rear end of the vehicle to swing outwardly as much (initially) as the forward end swings in the desired direction. Such a tail swing, at the hands of a driver who either did not expect it, because of inexperience or had forgotten to allow for it, could cause sideswiping of another vehicle or of stationary material or a building. According to the present invention, a comparatively simple and very satisfactory system is provided whereby the driver may choose any one of the three designated steering schemes merely with a flip of a control lever. According to the present invention, this is accomplished by providing three tie or track rod assemblies, each of which can be locked automatically at a given length and which is free to change its length when unlocked. A different one is locked for each class of steering, leaving the other two performing no function at that time. The locking is accomplished hydraulically by the movement of a selector valve between three positions. For two-wheel steering, one tie rod locks the rear wheel in parallelism to the vehicle. For normal four-wheel steering, one tie rod assembly locks the rear wheels in a relationship to the front wheels such that they move inversely. For four-wheel "crab" steering, the third tie rod assembly is locked at the correct length to tie front and rear steering arms together for wheel turning movement in the same direction of rotation.

To accomplish the locking of a tie rod at a predetermined length, as is essential for each of the three classes of steering under this system, a novel length-setting cylinder, or hydraulic lock device, has been devised.

Further objects and advantages will become apparent from the following description, taken in conjunction with the drawings, in which:

FIGURE 1 is a schematic plan view of a portion of a vehicle embodying the invention;

FIGURES 2 and 3 are longitudinal sections through one of the hydraulic lock devices incorporated in the track rods;

FIGURE 4 is a section through one form of control valves for the hydraulic lock devices;

FIGURE 5 is a section through an unloading valve for the third hydraulic steering cylinder;

FIGURE 6 is a schematic drawing of a simplified form of the invention, including an especially developed selector valve shown on larger scale in cross section; FIG. 9 being an end view, FIG. 8 a vertical transverse cross section and FIG. 7 being a vertical axial cross section except that the upper half of the body follows line 7—7 of FIG. 8.

Figure 7:
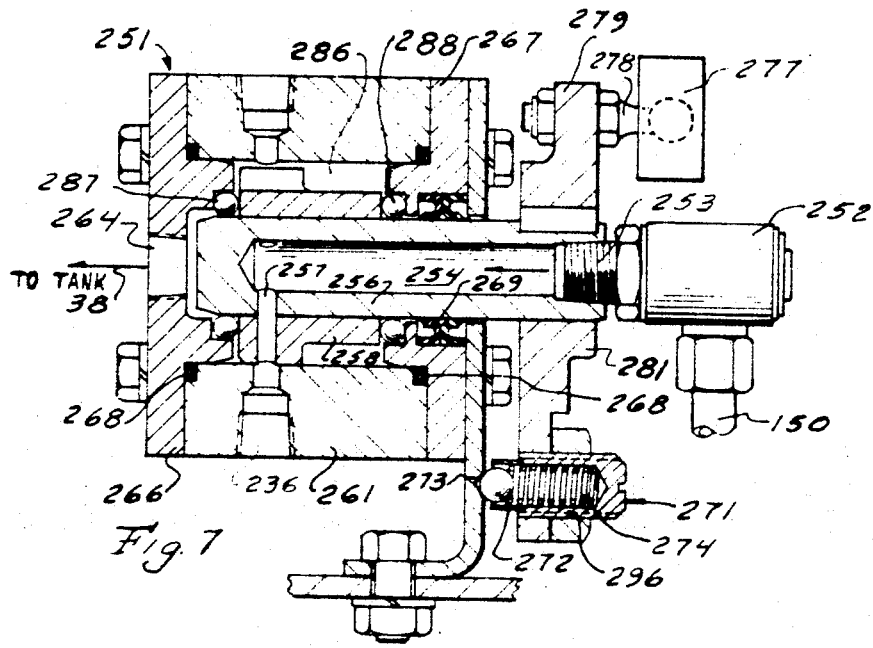
FIGURES 7 to 9 show a modified valve.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the invention concepts are found.

Illustrated in FIGURE 1 are portions of the chassis of a four-wheel drive vehicle having four dirigible steerable wheels. These portions include a front axle assembly comprising a nondirigible axle housing 10 on the ends of which are articulated the dirigible wheels 11 and 12.

There is also a nondirigible rear axle housing 13 with articulated, dirigible wheels 14 and 15 mounted on the ends thereof. The specific manner in which the wheels are articulated and provided with driving connections forms no part of the present invention.

Wheels 11 and 12 have, respectively, forwardly extending track arms 17 and 18, and inwardly extending track arms 19 and 20. The two forward track arms 17 and 18 are connected by a track or tie bar 21 which is pivotally secured to the two track arms. The rear wheels 14 and 15 have rearwardly extending track arms 22 and 23 respectively and inwardly extending track arms 24 and 25 respectively. A rearward track or tie bar 26 is pivotally secured to track arms 22 and 23.

The steering mechanism for front wheels 11 and 12 is generally conventional. Thus, there is a steering assembly comprising a steering wheel 29 connected to a steering valve 30 and a manual steering shaft 31. Steering shaft 31 connects to the front wheels 11 and 12 through a suitable steering mechanism (not shown). Hydraulic fluid or oil is supplied to valve 30 from a supply tank 32 by a pump 33. The intake of pump 33 is connected to tank 32 by a conduit 34. A conduit 35 connects the discharge of pump 33 with an unloading valve 36. The oil from unloading valve 36 goes to steering valve 30 through a conduit 37 to the extent that it is required. To the extent that more oil is pumped than is required by the steering mechanism, the excess oil flows from the relief valve 36 to the supply tank through a return conduit 38. Return conduit 38 also connects to steering valve 30 to accommodate the return flow from the steering cylinders.

The two front steering cylinders are connected between the nondirigible axle housing 10 and the track arms 17 and 18 respectively. Thus, the body of cylinder 41 is pivotally connected to the housing at 42 with the piston rod 43 of piston rod 44 being pivotally connected to track arm 17 at 45. The body of steering cylinder 46 is pivotally connected to housing 10 at 47. Pivotal connection 48 secures piston rod 49, and thus piston 50, to track arm 18. Conduits 51 and 52 connect double-acting cylinders 41 and 46 with the steering valve 30 in a manner such that the two cylinders work together in the conventional way in assisting the turning of the dirigible wheels 11 and 12 from side to side in response to movements of the steering wheel.

General description of steering selection

In my invention I employ a track or tie rod apparatus generally 55 to connect the rear dirigible wheels to the front wheels for normal four-wheel steering; a track or tie rod apparatus generally 56 to connect the front and rear wheels for four-wheel "crab" steering; and a locking apparatus generally 57 to hold the rear wheels in place when only two-wheel steering is desired. While sufficient power can be obtained from front wheel cylinders such as 41 and 46 for four-wheel steering (either normal or "crab"), the form of the invention shown in FIG. 1 employs a supplemental steering cylinder 58 for four-wheel steering, since this reduces the strain on the overall apparatus. It may also permit the use of smaller cylinders than if only two were used. This is omitted in the simplified form of the invention shown in FIG. 6.

A control device, hereafter described, is provided with a selector switch to enable the operator either to lock up track rod apparatus 55 for normal four-wheel steering, or to lock up track rod apparatus 56 for four-wheel "crab" steering or to lock up apparatus 57 for two-wheel steering. As will be described, the selector switch also connects steering cylinder 58 ( if used) to the steering valve 30, in one sense for regular four-wheel steering and in the opposite sense for four-wheel "crab" steering. Cylinder 58 is rendered inactive during normal two-wheel steering.

Steering cylinder 58 generally corresponds to the other two steering cylinders 41 and 46. It comprises a cylinder body 60 pivotally connected at 61 to a portion of rear axle housing 13. It has a piston 62 and piston rod 63. Piston rod 63 is pivotally connected at 64 to track arm 22.

Locking cylinder 57 comprises a cylinder body 66 pivotally connected to the nondirigible rear axle housing 13 at 67 and a piston rod 68 pivotally connected to track arm 23 at 69. Similarly, track rod apparatus 56 comprises a cylinder body 70 pivotally connected to track arm 25 at 71 and a piston rod 72 pivotally connected to track arm 20 at 73. In general, track rod apparatus 55 is the same except that it includes a motion-reversing lever 74 pivotally mounted at 75 on a nondirigible portion of the chassis. A cylinder body 76 (of apparatus 55) is pivotally connected to track arm 24 at 77 with the piston rod 78 being pivotally attached to one end of lever 74. A connecting rod 79 is pivotally secured to the other end of lever 74 and is pivotally connected to track arm 19 at 80.

Lock-cylinders

The structure of cylinders 66, 70 and 76 with their related pistons and piston rods is generally the same except for size. In connection with FIGURES 2 and 3 the structure of cylinder 76 will be described, and this description is applicable to the other two. Cylinder 76 is formed of two cylinder parts 83 and 84. As will be seen, these two cylinder parts vary in both their external and internal diameters. They are telescoped together and are fastened together as by means of welding. Cylinder part 83 has an end plug 85 therein which holds bearing 86 and seal 87 for piston rod 78. Seal 87 also is supplemented by a bellows 88 affixed to both the cylinder and the piston rod and serving as a dust and dirt guard. A passageway 89 communicates with the interior of the cylinder adjacent plug 85. A plug 91 is secured in the end of cylinder part 84. Adjacent plug 91 is a passageway 92 communicating with the interior of the cylinder. As hereinafter described passageways 89 and 92 are connected to a common conduit 196.

An abutment 93 is fixed in the cylinder body and divides the cylinder into two halves of approximately equal length. A passageway 94 (connected to conduit 192) communicates with the interior of the cylinder through this abutment. Piston rod 78 has a head 95 secured thereto and of a size to pass through the cylindrical central opening in abutment 93. Piston 96 in cylinder part 84 is sufficiently large so as to contact abutment 93 when in juxtaposition thereto and also contacts head 95. An annular piston 97 is in cylinder part 83. Piston 97 has portions sufficiently large to contact abutment 93 axially and portions sufficiently small in internal diameter to axially abut head 95. Piston 97 has sliding contact with both rod 78 and cylinder 83, and hence has external seals and an internal seal. Piston 96, being imperforate, has only external seals.

When hydraulic fluid under pressure is applied to the two end passageways 89 and 92, with hydraulic fluid being permitted to flow out of central passageway 94, the two pistons 96 and 97 are driven toward each other. One or the other will contact head 95 on piston rod 78 to drive the piston rod to the center position illustrated in FIGURE 2. For example, if the piston rod initially were in the position illustrated in FIGURE 3, the hydraulic fluid applied to conduit 196 and passageway 92 would push piston 96 against head 95 and then would continue to push the head and piston rod to the FIGURE 2 position. At the same time, the hydraulic fluid entering passageway 89 would move piston 97 from the FIGURE 3 to the FIGURE 2 position. Had head 95 been within cylinder part 83, to the left of abutment 93, the latter movement of piston 97 would have moved head 95 to the right, to center it within abutment 93.

In either event the result is that the two pistons contact the opposite sides of head 95 and abutment 93 to "lock" the piston rod with respect to the cylinder. The track rod apparatus 55 is then "locked up" at a predetermined length. Thus, (referring to FIGURE 1) as the front wheels 11 and 12 are turned back and forth, the rear wheels 14 and 15 will move therewith but in the opposite direction of rotation because of motion-reversing lever 74. The result will be normal four-wheel steering. When the hydraulic pressure applied at passages 89 and 92 is removed and hydraulic fluid permitted to move freely into and out of passageways 89, 92 and 94, the piston rod 78 will float in cylinder 96, i.e., it is no longer locked up, and track rod apparatus 55 no longer has any control over the steering of the rear wheels 14 and 15.

Similarly, if track rod apparatus 56 is locked up by the application of hydraulic fluid to the two ends of the cylinder 70, the rear wheels 14 and 15 will turn with the front wheels 11 and 12 in the same direction. This, of course, will produce four-wheel "crab" steering. By releasing that oil pressure and permitting the hydraulic fluid to freely flow into and out of the two ends and central passageways (corresponding to passageways 89, 92 and 94), track rod apparatus 56 will be unlocked, and the piston rod 72 will float with respect to the piston body 70.

During four-wheel steering the hydraulic fluid is permitted to freely flow out of and into the two end passageways and the central passageway of cylinder 66 of locking apparatus 57 so that the apparatus is unlocked and rear wheels 14 and 15 are free to turn. When only two-wheel steering is desired, hydraulic fluid under pressure is applied to the two end passageways of cylinder 66, thus forcing the two pistons thereof against the head on piston rod 68 and locking up the piston rod against movement with respect to the cylinder 66. This, of course, holds rear wheels 14 and 15 in the straight ahead position illustrated in FIGURE 1.

*Selection valving*

The control apparatus, indicated in FIG. 1, for locking and unlocking the track rod apparatus 55 and 56, and the two-wheel locking apparatus 57, and for determining the sense in which steering cylinder 58 is actuated will now be described. This control apparatus comprises a two-part selector valve operated by a lever 100 which is conveniently placed such as on the steering column. One part of the selector valve includes a fixed body 101 having ports 102, 103, 104 and 105 therein. Within the body 101 is a rotor 106 having passages 107, 108 and 109 therein. The second part of the selector valve comprises a body 110 having ports 111, 112, 113 and 114 and a rotor or core 115 having passages 116 and 117 therein. Conduits 51 and 52 connect to ports 114 and 112 respectively. Conduits 118 and 119 connect to ports 111 and 113 respectively, and to the two ends respectively of double-acting steering cylinder 58. According to conventional valve practice some leakage may be expected past core 115, and a drain line (not shown) is provided from the interior of body 110 to tank 32.

In the position of rotor 115 as illustrated the hydraulic fluid cannot flow from conduits 51 and 52 to conduits 118 and 119, so that steering cylinder 58 is inactive. This, of course, is the condition for two-wheel steering. If rotor 115 is turned approximately 45° in one direction, conduits 51 and 52 communicate in one sense with conduits 118 and 119 (through passages 116 and 117 of the rotor). Conversely, if the rotor is turned approximately 45° in the opposite direction from the position illustrated, conduits 51 and 52 communicate in the opposite sense with conduits 118 and 119. This permits a reversal of the sense in which steering cylinder 58 operates as related to the operation of steering cylinders 41 and 46, which control is required in distinguishing between normal four-wheel steering and four-wheel "crab" steering.

Conduits 118 and 119 also connect to an unloading valve diagrammatically shown at 122. This is of a class known as pilot actuated in that it is controlled by pressure from a pilot or control conduit 123. The purpose of unloading valve 122 is to unblock steering cylinder 60 when switching from one mode of steering to another. As will be hereinafter described, the pilot fluid pressure is applied to conduit 123 when switching from one mode of steering to another. This causes valve spool 124 to move to the left in FIGURE 1 so that both the conduits 118 and 119 are placed in communication with return conduit 38. The result is that hydraulic fluid can flow freely into and out of either end of steering cylinder 60 so that the piston rod of the steering cylinder is free to shift back and forth under the influence of other forces. When the change in mode of steering is completed, a bleed passage will permit spool 124 to return to the position illustrated. In this position conduits 118 and 119 are cut off from each other and from return line 38.

A sophisticated form of unloading valve 122 and the bleeder reset is illustrated in FIGURE 5. It comprises a valve body 127 having two bores 128 and 129 therethrough. Conduit 118 communicates with one end of bore 128, and conduit 119 with one end of bore 129. In bore 128 a valve member 130 has a closure 130a which is urged against the seat 131 by a spring 132. The upper end of spring 132 bears against a C-washer 133 held in a groove in body 127. Closure 130 has a stem 130b secured to a piston 134 having a bleed opening 134a therethrough. Similarly, in bore 129 is a C-washer 135, a spring 136, a valve member 137 with a closure 137a and a stem 137b, and a piston 138 with a bleed opening 138a. Communicating with the two bores is a central chamber 139 which also communicates with conduit 38 and an end chamber 140 which is the pilot actuation chamber and which communicates with conduit 123

In normal operation, the unloading valve of FIGURE 5 is closed by reason of springs 132 and 136 urging closures 130a and 137a onto their respective seats. Thus, conduits 118 and 119 are shut off from communication with each other and with conduit 38. When fluid pressure is applied to control conduit 123, pistons 134 and 138 are urged upwardly, lifting closures 130a and 137a from their respective seats. Thus, for example, hydraulic fluid can flow from conduit 118 through openings 130c in valve member 130, about raised closure 130a into central chamber 139 and into return line 38 or, back through valve members 137 to conduit 119. When there is no longer a source of pressure in conduit 123 the residual pressure is dissipated through bleed openings 134a and 138a. In other words, flow through bleed openings 134a and 138a, or either of them, allows the two valves to close under the urging of springs 132 and 136. Thereupon, steering cylinder 60 can be hydraulically operated in the normal manner.

The portion of the control mechanism for locking track rod apparatus 55 and 56 or for locking apparatus 57 is supplied with hydraulic fluid from a pump 145 connected to supply tank 132 by a conduit 146. Pump 145 supplies hydraulic fluid to an accumulator tank 147 through a conduit 148, a valve 149 and a conduit 150. Valve 149 is an unloading valve which permits hydraulic fluid to flow into tank 147 until a predetermined pressure is reach, e.g., 1600 lbs. per square inch. Thereafter the excess fluid from pump 145 returns relatively freely to tank 32 through conduit 38, but oil from accumulator tank 147 is not allowed to flow back to tank 32

Conduit 150 also communicates with port 105 on selector valve body 101. A conduit 151 connects port 102 and a lock cylinder valve 152 controlling the operation of track rod apparatus 56. Conduit 153 connects port 103 and lock cylinder valve 154 for locking apparatus 57. A conduit 155 connects port 104 and lock cylinder valve 156 for track rod apparatus 55.

In FIGURE 4 all of the valves 152, 154 and 156, along with check valve 125, are incorporated in a single valve body 160. Valve 152 comprises a plunger or sliding valve member 161 which normally contacts a seat 162a on an insert 162. Valve member 161 has a skirt 161a with openings 161b. A spring 163 urges the valve member up against its seat. An upper annular chamber 164 communicates with a conduit 165 threaded into the back side of the body. A lower annular central chamber 166 communicates with return conduit 38 through a bore 167.

A bottom transverse bore 168 communicates with conduit 123. Above transverse bore 168 the body forms a seat 169. A ball check valve closure 170 is urged against seat 169 by a spring 171. Between central chamber 166 and seat 169 a conduit 172 communicates with the central opening 173. As will be seen from FIGURE 1, conduit 172 communicates with the center of cylinder 70, while conduit 165 communicates with the two ends thereof.

Valve 154 has a central opening 175 above which is a central chamber 176 in communication with bore 167. Body 160 forms a set 177 against which a ball 178 is urged by a spring 179. A conduit 180 communicates with central opening 175 above seat 176. The top insert 181 defines a seat 181a. Valve member 182 is normally urged against seat 181a by spring 183. Valve member 182 has a skirt 182a and openings 182b. A conduit 184 communicates with upper annular chamber 185. By reference to FIGURE 1 it will be seen that conduit 184 communicates with the two ends of cylinder 66, while conduit 180 communicates with the central part of that cylinder.

Valve 156 has a central opening 187 above which is an annular central chamber 188 and below which is a valve seat 189. A ball 190 is urged against seat 189 by a spring 191. A conduit 192 communicates with central opening 187. A top insert 193 forms a seat 193a against which valve member 194 is urged by a spring 195. Valve member 194 has a skirt 194a and openings 194b. A conduit 196 communicates with upper annular chamber 197. By reference to FIGURE 1 it will be seen that conduit 192 communicates with the center of cylinder 76, while conduit 196 communicates with the two ends thereof.

Body 160 defines a seat 200 at one end of bore 168. A ball closure member 201 is urged against seat 200 by a follower 202 and a spring 203. A vertical bore 204 communicates with bore 167 and conduit 38 and chamber 205 in which ball 201 is received. This latter structure, of course, forms check valve 125 of FIGURE 1. It is adjusted to open at a pressure of about 65 lbs. per square inch in bore 168.

In FIGURES 1 and 4 the control apparatus is set for two-wheel steering. Thus, rotor 115 is in the disconnect position as far as supplemental steering cylinder 58 is concerned. Rotor 106 is set so that fluid pressure is applied to conduit 153 from conduit 150. Fluid pressure is not applied to either conduit 151 or 155. In fact, they are connected to tank 32 by a drain line. Thus, the closures 161 and 194 are in the upper position against their seats 162a and 193a. The position of closure 161 permits conduits 172 and 165 to be in communication through the central part of the valve and to be in communication with the return line 38 through the central chambers and bore 167. As was previously explained herein, when the two ends of the lock cylinder, such as 70, are in communication with the central part thereof and with the return line, the cylinder is in the unlocked position and the piston rod is free to move back and forth with respect to the cylinder. Similarly, valve 156 is in the position in which cylinder 76 is unlocked since the pipe 196 to the two ends is in communication with the pipe 192 to the center thereof and with the return line 38.

However, the fluid pressure applied to the top of valve 154 has moved the valve member 182 to the lowered position. It has been moved to this position by the hydraulic fluid entering conduit 153 under pressure and acting on closure 182 as a plunger. As the plunger reaches the position shown, oil flows into conduit 184 and thus, to the two ends of the lock cylinder 66, locking it up. The rear wheels are held in the straight position.

Assume, for example, that the driver of the vehicle wished to go from the illustrated two-wheel steering to normal four-wheel steering. He would operate lever 100 in a manner such as to turn rotors 106 and 115 (which may be parts of a single core) about 45° in a clockwise direction. By a small bleed line (not shown) to tank 32, this would relieve the fluid pressure from valve 154 so that the valve member 182 would move up against its seat 181a by reason of the urging of spring 183. At the same time, fluid pressure would be applied to the top of valve 156 through conduit 155. Valve member or plunger 194 would be moved downwardly which would apply hydraulic fluid from conduit 155 through chamber 197 to conduit 196. At the same time, skirt 194a would move past central chamber 188 cutting off communication between central opening 187 and return conduit 38.

The fluid pressure applied to conduit 196 would be in turn applied to the two ends of cylinder 76, forcing the two pistons 96 and 97 toward each other. Assuming that front wheels 11 and 12 were turned, as illustrated in FIGURE 1, the head 95 on piston rod 78 would be off-center with respect to abutment 93 (the head would be upwardly from the center as the situation is illustrated in FIGURE 1). Thus, piston 97 would commence driving head 95 toward the center abutment 93. This would turn rear wheels 14 and 15 to correspond to the extent to which the front wheels 11 and 12 were already turned. When head 95 was centered within abutment 93, the rear wheels would be turned to the same extent as the front wheels previously had been turned.

The movement of pistons 96 and 97 toward each other would pressurize the oil in the portion of the cylinder between the two pistons. This oil would exit through passageway 94, conduit 192 and into the central opening 187 of valve 156. This would usually begin before either piston engaged head 95 to move the piston. The oil thus ejected from cylinder 76 would unseat ball 190 and would build up pressure in conduits 168 and 123. Referring to FIGURE 5, the build-up of oil pressure in conduit 123 would raise pistons 134 and 138 so as to unload steering cylinder 60 as previously described. To the extent that the pressure of the oil in conduit 123 exceeded a predetermined value (e.g., 65 lbs. per square inch, a safe amount over the pressure required to operate pistons 134), ball check 201 would be unseated and the excess oil would be allowed to flow into conduit 38. When pistons 96 and 97 both rest on abutment 93, no more oil will be pressed into conduits 168 and 123, and ball 201 would again seat. The remaining pressure in conduit 123 would be relieved by hydraulic fluid flowing through weep openings 134a and 138a. Upon the pressure in conduit 123 being relieved below the actuating pressure for pistons 134, closure members 130 and 137 of FIGURE 5 would reseat so that the unloading of steering cylinder 60 would be at an end.

The clockwise movement of rotor 115 of the selector valve would place conduits 52 and 118 into communication with each other and would place conduits 51 and 119 into communication with each other. Thus, when steering cylinder 60 was no longer unloaded, it would take over a portion of the further steering load supplementing steering cylinders 41 and 46. Track rod apparatus 55 would remain locked-up so long as valve 156 was actuated as described. Track rod apparatus 56 and locking apparatus 57 would remain unlocked, or disengaged, so that the piston rods would move freely with respect to their respective cylinders and would not affect the steering.

In a similar fashion cylinder 70 would be locked-up by the actuation of valve 152 should the rotors 106 and 115 be rotated in a counterclockwise direction from the position illustrated in FIGURE 1. When cylinders 70 of track rod apparatus 56 was locked-up, track rod apparatus 55 would be in the floating condition as would be the locking apparatus 57.

Simplified form of invention

FIGURE 6 shows a form of the invention which is greatly simplified as compared to FIGURE 1. Part of this simplification results from omitting the rear steering cylinder 58. This makes unloading valve 122 unnecessary, and that in turn makes its control valve section 115 unnecessary. The great simplification is further achieved by the provision, according to this invention, of a manual selection valve which directly controls the three lock cylinders, making unnecessary the intermediate control valves 152, 154 and 156.

As seen in FIGURE 6 each of the lock cylinders 55, 56 and 57 has its center port in constant communication with supply tank 32, through lines 38. The connection should be such as to make oil without pump pressure constantly available to be drawn into these ports, so that there will be no cavitation.

It is now merely necessary that the two end ports of each of the lock cylinders be alternatively connectible either to pump pressure or to line 38 leading to the tank, and that when one of the lock cylinders has its end ports connected to pump pressure the other two automatically have their ends connected to line 38. This is accomplished by newly developed valve 211, shown on a scale much enlarged as compared to the vehicle scale of FIGURE 6.

Valve 211 includes a valve casing or cylinder 213 and a sliding plunger or spool 213. Spool 213 is controlled by a handle 214 accessible from the driver's position. Spool 213 is movable between three positions, in each of which it is held by spring detent means. Thus a detent ball 215 may be pressed into anyone of three notches 216 by spring 217. The spring 217 and ball 215 are part of a detent plug 218, which may be removed to permit removal of spool 213. The tip 219 of detent plug 218 extends into a slot 221, thereby confining spool 213 against angular movement, while permitting its axial movement. Thus the slot 221 extends parallel to the axis, its transverse dimension being only slightly greater than the diameter of tip 219 to permit a smooth sliding action.

From comparison of the rear wheels with the front wheels in FIGURE 6, it is evident that the vehicle is in the two wheel steering condition. Accordingly, the valve 211 has been shown with its spool 213 in its two wheel steer position. This is with its actuating end 222 withdrawn to the maximum extent. In this position groove 223 is aligned with port 224. This port has been shown in broken lines because it is preferably 90 degrees removed from the plane of the drawing. Groove 223 is always in communication with pump pressure port 226, to which pressure line 150 is connected. This constant connection is accomplished by a longitudinal groove 227 which extends past port 226 in both extreme positions of spool 213. Port 224 which is thus connected to pump pressure is connected through line 184 with the end ports of lock cylinder 57. Thus, with the illustrated position of valve 211, pump pressure is supplied to the end ports of lock cylinder 57 forcing its pistons against the mid-abutment, the oil thus discharged from between the pistons being passed directly to the tank through line 38.

In this condition of valve 211, the end port lines 165 for lock cylinder 56, and 196 for lock cylinder 55, are connected by valve 211 to tank line 38. Thus line 165 leads to port 230 and line 196 leads to port 232. Each of these ports is, in this position of spool 213, connected through radial bores 233 and 234 with an axial bore 235 which is connected through a hose 236 at one end of spool 213 with tank line 38.

If spool 213 is moved to its intermediate position, peripheral groove 223 connects pump pressure to port 230 and hence to line 165 leading to the end ports of lock cylinder 56, thereby pressing its pistons against the mid abutment and locking this cylinder. The end ports of lock cylinder 55 will continue to be connected to tank line 38, in this instance through radial port 233 which will now be aligned with port 232. The end ports of lock 57 will now be connected to tank line 38 likewise. Thus line 184 from the end ports of lock cylinder 57 leads to port 224 which is now aligned with radial passage 237 leading to axial bore 235, flexible hose 236 and tank line 38.

If spool 213 is moved to its third position, with operating end 222 at its extreme inward position, pump pressure peripheral groove 223 is aligned with port 232 to connect pump pressure to line 196 which leads to the end ports of lock cylinder 55. This forces the pistons of lock cylinder against this mid abutment locking up its associated linkage for crab steering. At the same time the end ports of the other two cylinders 56 and 57 will be connected to tank line 38. We have seen that this tank line is constantly connected to the bore 235 of spool 213 through flexible hose 236. With this third position of spool 213, axial bore 235 will be connected to port 230 through radial bore 237 and the port 224 through radial bore 237'.

Of course, inasmuch as ports 224 and 232 are in fact ninety degrees removed from the plane of the drawing, there will be radial bores leading to them at the appropriate angularity. There must also be radial bores 233 and 237 in the plane of the drawing, however, since these are needed for port 230. Radial bores 234 and 237' are not needed in the plane of the drawing. However, radial bore 234 preferably connects with a peripheral groove 238 for conducting any leakage oil to the tank. A similar peripheral groove may be provided in alignment with radial bore 237', if found necessary or for utmost safety against leakage of oil. Of course, both ends of valve cylinder 212 are provided with oil seals 241 and wipers 242.

Another change which can be made for economy of construction, if space permits is to place the four-wheel steer lock cylinder 56 near lock cylinder 55. It would then extend from the left-hand end of rocker link 74 to the track arm 24 (or a track arm similarly disposed). It could then be as short as lock cylinder 55, the greater length where it is illustrated being needed for smooth action and structural strength, not for length of movement.

Although line 150 in FIG. 6 could be supplied with pump pressure as in FIG. 1, it is more economical to use a pump 250 of a type which provides constant pressure but variable delivery.

Figures 8, 9:
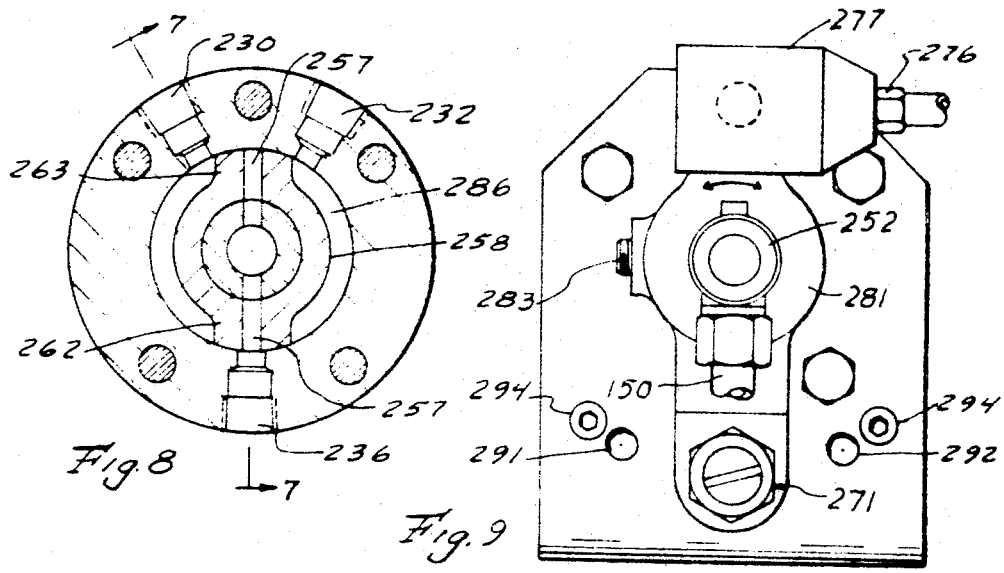

The form of control valve shown in FIG. 6 has been found to require more force for its operation than is preferred, and the valve of FIGS. 7 to 9 has therefore been developed.

Control valve of rotary type

FIGS. 7 to 9 show an improved form of valve serving the same function as valve 211 of FIG. 6. Indeed, its ports leading to the respective locking cylinders have been given the same numbers, 230 for crab steering (lock cylinder 56) 232 for four-wheel steering (lock cylinder 55) and 236 for two-wheel steering (lock cylinder 57).

In FIGS. 7 to 9 the valve 251 has been shown in the position for two-wheel steering. Thus, pressure from pipe 150 flows through hydraulic swivel unit 252, swiveling fitting 253, into a bore 254 of core 256 of valve 251. From bore 254 the hydraulic pressure fluid can flow through either radial bore or port 257 or 257' in core 256 and in collar 258. As seen best in FIG. 8, core 256 is turned to such angularity that radial bore 257 communicates with port 236 formed in shell 261. The interior surface of shell 261 is wiped by valving projections 262 and 263 of collar 258. The wiping or valving surfaces of parts 261, 262 and 263 are accurately honed or lapped to give a smooth and snug running fit so that there is very little leakage. These parts are made of the same metal so that the fit will be substantially unaffected by temperature changes. Any slight seepage, or for that matter, any substantial leakage, would merely pass out of the valve through discharge port 264 to which tank return or tank line 38 is connected.

Shell 261 is thoroughly sealed to end the plates 266 and 267 by O ring seals 268. Core 256 is thoroughly sealed by rotary seal 269.

Core 256 is held in its angularly adjusted position by detent assembly 271. Detent ball 272 is urged into notch 273 by spring 274.

Core 256 may be shifted to either of its other positions by control rod 276 controlled by a manual lever at one end and engaging a clevis or socket member 277. This has been shown as a socket member of a ball and socket connection, the ball being at the end of a stem 278, carried by lever 279 forming part of the actuating member 281 fast on the projecting end of core 256. Actuator 281 may be keyed to core 256 by a key 282, and held against axial removal by a setscrew 283.

When actuator 281 is moved in one direction by control rod 276, upper valving projection 263 will move into alignment with port 232 and connect fluid pressure from bore 254 to the lock cylinder 55 for four-wheel steering. When core 256 is swung to its extreme position in the opposite direction, valving projection or lug 263 is aligned with port 230 to connect fluid pressure to locking cylinder 56 for crab steering.

It is apparent from FIG. 18 that when one of the ports 232, and 236 is connected to pressure, to bore 254, the other two thereof will be connected to the annular space 286 surrounding collar 258. The annular space 286 is connected with discharge port or tank port 264. Although the clearance for this connection looks small in FIG. 7, it extends all of the way around the collar 258 and is quite adequate, even though the fluid has to flow between the balls 287 of the rear ball-bearing set. There is also a front ball-bearing set comprising balls 288.

It should be observed that this valve operates with great ease. The high-pressure hydraulic thrust within the valve proper is balanced by the opposite thrust on swivel 252, and these swivels are already well developed to minimize friction from such thrust. The slight axial hydraulic thrust from the return line pressure might be negligible, but in any event, is fully absorbed by ball bearings 288. Radial hydraulic thrust is substantially balanced by virtue of the fact that ports 257 and 257' are exposed in opposite directions with valving surfaces of equal areas (except as affected by ports 230, 232 or 236). Except very briefly after movement of core 256 to a new position, each of ports 257 and 257' will be exposed to full hydraulic pressure, so that they will accurately balance one another. Even during the few seconds in which they may not accurately balance one another, radial thrust is taken up by ball bearings 287 and 288. Accordingly, the valve is dependably very easily shifted from one position to another, except for the desirable initial resistance provided by a detent ball 272 as it rides out of one of the detent recesses 273, 291 or 292. As a matter of fact, the movement can be easy enough so that if any need should be found for doing so, the detent recesses 273, 291 and 292 could be provided with sloping surfaces extending contiguous with one another so that it will become impossible to release the actuator 281 and have it remain in any position except one of the three proper positions. Except for such self-positioning, there may be greater ease of turning than is needed, and testing wih nonrotary bearings may show that they are sufficient. Thus, balls 288 could be replaced by a bearing sleeve, and balls 287 by a perforated bearing sleeve or possibly merely an axially acting compression spring. For more certain smoothness of the turning of core 256 if a spring is used, additional intermediate blind bearing lugs could be provided between valving lugs 262 and 263, each with a lapped surface running on the inside of shell 261. The ninety-degree or midway positions would never block any port.

Movement of the actuator 281 further from its central position than is represented by recesses 291 and 292 is prevented by stops 294 which may be struck by detent screw 296.

Achievement

From the foregoing it is apparent that at the flip of a lever the steering system can be converted to any of the three classes of steering. The accumulator tank or constant pressure pump ensures prompt readjustment even if the engine is idling. The chosen controlling tie rod or track rod when locked by its locked cylinder then functions as a mechanical link. With exact dimensioning of the abutment 93 and piston head 95 so as to be axially abutted simultaneously by both pistons, the tie rod in use is locked at an exact predetermined length. This ensures the proper correlation of steering movements, front and rear; or exact straightness of the rear wheels during two-wheel steering. In spite of this accomplishment, the system is trouble-free and is relatively simple (especially the forms of FIGS. 6 to 9) in which greatly improved and simple control valves have been provided.

I claim:

1. In a vehicle having source means for supplying hydraulic fluid under pressure, a rigid front axle member, a rigid rear axle member, dirigible wheels mounted on the ends of said members, and hydraulic cylinder means connected to a relatively fixed member and to the two dirigible wheels at one end for steering, the improvement comprising:

a hydraulic lock device connected between a relatively fixed member and the other of the dirigible wheels; a track rod device interconnecting the said other dirigible wheels; front to rear tie rod means directly interconnecting the front and rear dirigible wheels; front to rear tie rod means inversely interconnecting the front and rear dirigible wheels; each of said means including a hydraulic lock device; said lock devices being adapted alternatively to float in length and to be predeterminedly fixed in length depending on the application of hydraulic fluid thereto; and steering means including a control device connected to said source means and to said hydraulic cylinders to suppyl hydraulic fluid to said first cylinder means at all times in response to a steering command;

each hydraulic lock device including a cylinder with an internal abutment intermediate its ends and with ports at said intermediate abutment and both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder; and control valve means for selectively locking anyone of the lock devices by connecting its end ports to a source of power while connecting the end ports of the other lock devices for relatively free flow whereby a selection may be made of one of: two-wheel steering, normal four-wheel steering and "crab" four-wheel steering;

said control valve means comprising a single three-position valve having a first port connected to a continuous source of hydraulic pressure, a second port connected to relatively pressureless liquid, and selection ports each constantly connected to the end ports of a different one of the lock devices; said valve in each position connecting a different one of the selection ports to the first port, and connecting the second port to the other selection ports.

2. In a vehicle having source means for supplying hydraulic fluid under pressure, front steerable wheels and rear steerable wheels, and hydraulic means connected to the two wheels at one end for steering, the improvement comprising:

a track rod device interconnecting the said other dirigible wheels; front to rear tie means interconnecting the front and rear dirigible wheels for correlated steering of one by the other; additional rod means connected to at least the wheels at the other end for a different type of steering; each of said rod means including a hydraulic lock device;

each hydraulic lock device including a cylinder with an internal abutment intermediate its ends and with ports at said intermediate abutment and both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and control valve means for selecting between the types of steering by connecting the end ports of a selected one of the hydraulic lock devices to the source means while connecting the other ports for relatively free flow of fluid;

said control valve means comprising a single plural-position valve having a first port connected to a continuous source of hydraulic pressure, a second port connected to relatively pressureless liquid, and selection ports each constantly connected to the end ports of a different one of the lock devices; said valve in each position connecting a different one of the selection ports to the first port, and connecting the second port to the other selection port or ports.

3. Selective steering apparatus for steering a vehicle for two-wheel steering, normal four-wheel steering or crab four-wheel steering including a coupled pair of front steerable wheels, and a coupled pair or rear steerable wheels, and characterized by having:

a variable length tie rod linkage means for each type of steering, each including means for hydraulically adjusting and locking its length; one linkage being between the rear couple and a fixed point, another between front and rear couples for like steering action and the other for between front and rear couples for inverse steering action;

each of the hydraulic lock means including a cylinder having end ports and a midport, having an internal fixed abutment adjacent the midport, and having pistons on opposite sides of the abutment adapted to lock the linkage by being hydraulically pressed against the abutment by supply of pressure fluid to the end ports while the center port is subject to approximately reservoir pressure, and a control valve having a port connected to the reservoir, a port connected to a hydraulic pressure source, and three control ports each connected to the end ports of one of the locking means, said control valve including a valving member movable to three positions in each of which it connects the hydraulic pressure port to a selected one of the control ports while connecting the other two control ports to the reservoir port.

4. Selective steering apparatus, according to claim 3 in which the control valve includes a shell of internal cylindrical contour having three control ports therein and a core having symmetrically disposed, mutually balancing valving lugs wiping said cylindrical contour, the ports being so disposed that only one thereof would be aligned with the valving lugs at a time, said core having substantial clearance with the cylindrical surface except at said valving lugs, and said valve providing communication from said clearance to a port for connection with discharge; said core being swivelly mounted in said shell.

5. Selective steering apparatus according to claim 3 in which the control valve includes a shell of internal cylindrical contour having three control ports therein and a core having symmetrically disposed, mutually balancing valving lugs wiping said cylindrical contour, the ports being so disposed that only one thereof would be aligned with the valving lugs at a time, said core having substantial clearance with the cylindrical surface except at said valving lugs, and said valve providing communication from said clearance to a port for connection with discharge; said core being swivelly mounted in said shell and detent means for securing the core in each of three positions, each being a position in which a port in a valving lug is aligned with the one of said control ports.

6. A selective steering apparatus according to claim 3 in which the valving core member is pivotable about an axis, has an internal passage connected to the fluid pressure port, and has a plurality of radially opening ports disposed symmetrically for mutual neutralization of radial thrust.

7. A selective steering apparatus according to claim 6, including detent means for securing the core in each of three positions, each being a position in which a port in a valving lug is aligned with one of said external ports.

8. A selective steering apparatus according to claim 6 in which the core has a swiveling hydraulic fitting for connection with a pressure source.

9. A selective steering apparatus according to claim 6, in which the core is mounted with rolling bearing means.

10. In a vehicle having a chassis with nondirigible portions and a pair of dirigible wheels at the front and a pair of dirigible wheels at the rear, a track rod device connecting the wheels of one pair, a track rod device connecting the wheels of the other pair, and a steering device connected to the one pair to enable said one pair to be steered, the improvement comprising:

first means connecting the other pair and one of said nondirigible portions to releasably lock said other pair of wheels in a front to rear aligned position; second means connecting the two pairs to releasably lock the other pair to the one pair so that as the one pair turns there is also a correlated turning of the other pair; and a control device connected to said means to selectively lock said other pair by said first means with said second means unlocking the connection between the two pairs, and alternatively to unlock said other pair by said first means and to lock said two pairs together.

11. A fluid position-locking device including a cylinder with a central internal abutment, a piston rod extending into said cylinder and having a head on the internal end thereof and movable in said cylinder to pass said abutment, a piston encircling said rod and movable along it, said piston being at one side of said abutment and in fluid-tight contact with said rod and cylinder, a piston at the other side of said abutment and in fluid-tight contact with said cylinder, said cylinder having a central fluid connection and two end fluid connections, each of said pistons being shaped to axially abut said head and said abutment.

12. In a vehicle having source means for supplying hydraulic fluid under pressure, front steerable wheels and rear steerable wheels, and hydraulic means connected to the two wheels at one end for steering, the improvement comprising:

a track rod device interconnecting the said other dirigible wheels; front to rear tie rod means interconnecting the front and rear dirigible wheels for correlated steering of one by the other; additional rod means connected to at least the wheels at the other end for a different type of steering; each of said rod means including a hydraulic lock device;

each hydraulic lock device including a cylinder with an internal abutment intermediate its ends and with ports at said intermediate abutment and at both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and control valve means for selecting between the types of steering by connecting the end ports of a selected one of the hydraulic lock devices to the source means while connecting the other ports for relatively free flow of fluid.

13. A hydraulic lock device including a cylinder with an internal abutment intermediate its ends and with ports at said intermediate abutment and both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder.

14. A hydraulic lock device according to claim 13, and valving means for selectively supplying pressure fluid to both end ports while the port at the intermediate abutment is connected for relatively free flow.

15. A selective steering means for controlling front and rear steerable wheels to provide different types of steering selectively including a plurality of linkage means rendered selectively effective by a lock cylinder device forming a part of each linkage means, each linkage means being part of means for effecting a different wheel-steering control;

said lock cylinder devices each including a cylinder with an internal abutment intermediate its ends and with ports at said intermediate abutment and both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and valving means for supplying pressure fluid to both end ports of a selected lock cylinder device while leaving the other ports connected for relatively free flowing.

16. In a vehicle having a chassis with nondirigible portions and a pair of dirigible wheels at the front and a pair of dirigible wheels at the rear, a track rod device connecting the wheels of one pair, a track rod device connecting the wheels of the other pair, and a steering device connected to the one pair to enable said one pair to be steered, the improvement comprising:

first means connecting the other pair and one of said nondirigible portions to releasably lock said other pair of wheels in a front to rear aligned position; second means connecting the two pair to releasably lock the other pair to the one pair so that as the one pair turns there is also a correlated turning of the other pair; and a control device connected to said means to selectively lock said other pair by said first means with said second means unlocking the connection between the two pairs, and alternatively to unlock said other pair by said first means and to lock said two pairs together;

wherein said means includes a double-acting fluid cylinder with piston means and piston rod, said cylinder having hydraulic fluid connections at the two ends thereof, said control device being selectively connected to the cylinder to apply fluid under pressure to the connections at both ends to lock the piston rod immovably in the cylinder by said application of fluid, and when fluid pressure is not so applied said piston rod being movable in the cylinder and the overall external length of the cylinder and piston rod being variable as forces are otherwise applied to the two.

17. In a vehicle having a chassis with nondirigible portions and a pair of dirigible wheels at the front and a pair of dirigible wheels at the rear, a track rod deevice connecting the wheels of one pair, a track rod device connecting the wheels of the other pair, and a steering device connected to the one pair to enable said one pair to be steered, the improvement comprising:

first means connecting the other pair and one of said nondirigible portions to releasably lock said other pair of wheels in a front to rear aligned position; second means connecting the two pairs to releasably lock the other pair to the one pair so that as the one pair turns there is also a correlated turning of the other pair; and a control device connected to said means to selectively lock said other pair by said first means with said second means unlocking the connection between the two pairs, and alternatively to unlock said other pair by said first means and to lock said two pairs together;

wherein said means includes a double-acting fluid cylinder with piston means and piston rod, said cylinder having hydraulic fluid connections at the two ends thereof, said control device being selectively connected to the cylinder to apply fluid under pressure to the connections at both ends to lock the piston rod immovably in the cylinder by said application of fluid, and when fluid pressure is not so applied said piston rod being movable in the cylinder and the overall external length of the cylinder and piston rod being variable as forces are otherwise applied to the two;

said piston rod having a head on the end thereof within the cylinder, said cylinder having an internal abutment between the ends, said piston means comprising pistons, one piston encompassing said piston rod and moving between said abutment and the end of the cylinder through which said rod extends, the other part being at the opposite side of said abutment, each part being sufficiently large to contact said abutment when in juxtaposition thereto and also abutting axially on said head when in juxtaposition thereto.

18. In a vehicle having a chassis with non-dirigible portions and a pair of dirigible wheels at the front and a pair of dirigible wheels at the rear, a track rod device connecting the wheels of one pair, a track rod device connecting the wheels of the other pair, and a steering device connected to the one pair to enable said one pair to be steered, the improvement comprising:

first means connecting the other pair and one of said non-dirigible portions to releasably lock said other pair of wheels in a front to rear aligned position; second means connecting the two pairs to releasably lock the other pair to the one pair so that as the one pair turns there is also a correlated turning of the other pair; and a control device connected to said means to selectively lock said other pair by said first means with said second means unlocking the connection between the two pairs, and alternatively to unlock said other pair by said first means and to lock said two pairs together;

wherein said means includes a double-acting fluid cylinder with piston means and piston rod, said cylinder having hydraulic fluid connections at the two ends thereof, said control device being selectively connected to the cylinder to apply fluid under pressure to the connections at both ends to lock the piston rod immovably in the cylinder by said application of fluid, and when fluid pressure is not so applied said piston rod being movable in the cylinder and the overall external length of the cylinder and piston rod being variable as forces are otherwise applied to the two;

said piston rod having a head on the end thereof within the cylinder, said cylinder having an internal abutment between the ends, said piston means comprising pistons, one piston encompassing said piston rod and moving between said abutment and the end of the cylinder through which said rod extends, the other part being at the opposite side of said abutment, each part being suffiicently large to contact said abutment when in juxtaposition thereto and also abutting axially on said head when in juxtaposition thereto;

said abutment being annular and said cylinder including a third fluid connection communicating with the cylinder through the abutment; said control device including valve means having two positions, in one of said positions said third connection being in communication with the two end connections and exhaust, in the other of said positions said third connection being diverted from its former connection with exhaust, and fluid pressure being applied to said two end connections.

19. In a vehicle having a chassis with non-dirigible portions and a pair of dirigible wheels at the rear, a track rod device connecting the wheels of one pair, a track rod device connecting the wheels of the other pair, and a steering device connected to the one pair to enable said one pair to be steered, the improvement comprising:

first means connecting the other pair and one of said non-dirigible portions to releasably lock said other pair of wheels in a front to rear aligned poosition; second means connecting the two pair to releasably lock the other pair to the one pair so that as the one pair turns there is also a correlated turning of the other pair; and a control device connected to said means to selectively lock said other pair by said first means with said second means unlocking the connection between the two pairs, and alternatively to unlock said other pair by said first means and to lock said two pairs together;

wherein said second means includes a pivoted lever having ends at oppoiste sides of the pivot point, a track rod part attached to the dirigible wheel of one pair at one side of the vehicle to move as the wheel is steered, a track rod part attached to the dirigible wheel of the other pair at said one side of the vehicle to move as the wheel is steered, and means connecting one track rod part with one of said ends and the other track rod part with the other of said ends.

20. In a vehicle having a chassis with non-dirigible portions and a pair of dirigible wheels at the front and a pair of dirigible wheels at the rear, a track rod device connecting the wheels of one pair, a track rod device connecting the wheels of the other pair, and a steering device connected to the one pair to enable said one pair to be steered, the improvement comprising:

first means connecting the other pair and one of said non-dirigible portions to releasably lock said other pair of wheels in a front to rear aligned position; additional means connecting the two pairs to releasably lock the other pair to the one pair in a sense such that the other pair turn in the same direction as the one pair and alternatively in a sense such that the other pair turn in the opposite direction as the one pair; and a control device connected to said means to selectively lock said other pair by said first means with said additional means unlocking the connection between the two pairs, unlock said other pair by said first means and lock said two pairs together in one sense, and unlock said other pair by said first means and lock said two pairs together in the other sense.

21. In a vehicle having source means for supplying hydraulic fluid under pressure, a rigid front axle member, a rigid rear axle member, dirigible wheels mounted on the ends of said members, and hydraulic cylinder means connected between one member and the two dirigible wheels thereon, the improvement comprising:

an additional hydraulic cylinder connected between the other member and one of the dirigible wheels thereon; a hydraulic lock device connected between said other member and the other of the dirigible wheels thereon; a track rod device connecting the two dirigible wheels on said other member; tie rod means connecting the two dirigible wheels at one side of the vehicle; tie rod means connecting the two dirigible wheels at the other side of the vehicle; each of said means including a hydraulic lock device; one of said means including a motion reversing lever; said lock devices being adapted to alternatively float in length and to be predeterminedly fixed in length depending on the application of hydraulic fluid thereto; a control device connected to said source means and to said lock devices to alternatively lock any one of the lock devices and permit the remaining two to move freely, whereby a selection may be made of one of: two-wheel steering, normal four-wheel steering and "crab" four-wheel steering;

and steering means including a control device connected to said source means and to said hydraulic cylinders to supply hydraulic fluid to said first cylinder means selectively at all times in response to a steering command and to supply hydraulic fluid to said additional cylinder in opposite senses when normal and "crab" four-wheel steering is called for by said control device.

22. In a vehicle having source means for supplying hydraulic fluid under pressure, a rigid front axle member, a rigid rear axle member, dirigible wheels mounted on the ends of said members, and hydraulic cylinder means connected between one member and the two dirigible wheels thereon, the improvement comprising:

an additional hydraulic cylinder connected between the other member and one of the dirigible wheels thereon; a hydraulic lock device connected between said other member and the other of the dirigible wheels thereon; a track rod device connecting the two dirigible wheels on said other member; tie rod means connecting the two dirigible wheels at one side of the vehicle; tie rod means connecting the two dirigible wheels at the other side of the vehicle; each of said means including a hydraulic lock device; one of said means including a motion reversing lever; said lock devices being adapted to alternatively float in length and to be predeterminedly fixed in length depending on the application of hydraulic fluid thereto; a control device connected to said source means and to said lock devices to alternatively lock any one of the lock devices and permit the remaining two to move freely, whereby a selection may be made of one of: two-wheel steering, normal four-wheel steering and "crab" four-wheel steering;

and steering means including a control device connected to said source means and to said hydraulic cylinders to supply hydraulic fluid to said first cylinder means selectively at all times in response to a steering command and to supply hydraulic fluid to said additional cylinder in opposite senses when normal and "crab" four-wheel steering is called for by said control device;

each hydraulic lock device including a double acting cylinder with a central internal abutment, a piston rod having a head on the internal end thereof and movable in said cylinder past said abutment, a piston encircling said rod and movable along it, said piston being at one side of said abutment and in fluid-tight contact with said rod and cylinder, a piston at the other side of said abutment and in fluid-tight contact with said cylinder, said cylinder having a central fluid connection and two end fluid connections, each of said pistons being shaped to axially abut said head and said abutment.

23. In a vehicle having source means for supplying hydraulic fluid under pressure, a rigid front axle member, a rigid rear axle member, dirigible wheels mounted on the ends of said members, and hydraulic cylinder means connected between one member and the two dirigible wheels thereon, the improvement comprising:

an additional hydraulic cylinder connected between the other member and one of the dirigible wheels thereon; a hydraulic lock device connected between said other member and the other of the dirigible wheels thereon; a track rod device connecting the two dirigible wheels on said other member; tie rod means connecting the two dirigible wheels at one side of the vehicle; tie rod means connecting the two dirigible wheels at the other side of the vehicle; each of said means including a hydraulic lock device; one of said means including a motion reversing lever; said lock devices being adapted to alternatively float in length and to be predeterminedly fixed in length depending on the application of hydraulic fluid thereto; a control device connected to said source means and to said lock devices to alternatively lock any one of the lock devices and permit the remaining two to move freely, whereby a selection may be made of one of: two-wheel steering, normal four-wheel steering and "crab" four-wheel steering;

and steering means including a control device connected to said source means and to said hydraulic cylinders to supply hydraulic fluid to said first cylinder means selectively at all times in response to a steering command and to supply hydraulic fluid to said additional cylinder in opposite senses when normal and "crab" four-wheel steering is called for by said control device;

including means connected to said third cylinder to unload said additional cylinder when changing from one of said forms of steering to another.

24. In a vehicle having a chassis with rigid portions and front and rear pairs of steerable wheels, the wheels of each pair being mechanically coupled and provided with two way hydraulic steering means, and the front pair being constantly manually controlled, the improvement comprising:

a plurality of separate length-lockable tie rods, a first, when the only one locked, coupling the rear pair to move in predetermined correlation to the front pair, and another, when the only one locked, effectuating another class of steering, each lockable tie rod including hydraulic lock-cylinder means having a central internal two-faced abutment, a floating piston on each side of the abutment, a piston rod with a head between the pistons and movable past the abutment, each end of the cylinder having a pressure port for hydraulically driving the pistons toward the abutment, the pistons axially abutting both the head and the abutment simultaneously to lock the tie rod at a predetermined length, and a relief port opening between the pistons for hydraulic discharge as the pistons are hydraulically driven, a pilot actuated unloading valve connected to the hydraulic steering means of the rear pair to permit oil to flow freely for readjustment thereof when the rear pair is moved by a length-change of a tie rod resulting from driving its pistons, said unloading valve having a pilot actuation chamber connected to the relief ports of the lock-cylinders;

automatic valve means for maintaining a pilot actuation pressure in the pilot chamber as long as oil is being discharged from a lock-cylinder, and bleed passage means for allowing return of the pilot actuated valve when said discharge ceases to permit restoration of normal connections to the steering means;

each lock-cylinder being controlled by a control valve having two positions, one connecting all the ports of the lock-cylinder together and to a tank, and the second connecting the end ports to a hydraulic pressure source and the relief port to the pilot chamber of the unloading valve;

and means accessible to the driver's position of the chassis for selectively operating one only of the control valves to its second position.

25. A fluid position-locking device including a cylinder with an internal abutment at a position intermediate of its length, a piston rod extending into said cylinder and having a head thereon movable in said cylinder to pass said abutment, a piston encircling said rod and movable along it, said piston being at one side of said abutment and in fluid-tight contact with said rod and cylinder, a piston at the other side of said abutment movable independently of the rod and in fluid-tight contact with said cylinder to form an expansion chamber therein, said cylinder having a fluid port at the abutment and two end fluid connections, each of said pistons being shaped to axially abut said head and said abutment to lock the head adjacent to the abutment when fluid under pressure is supplied to both end connections and discharge is permitted at the abutment.

26. A fluid position-locking device including a cylinder with an internal abutment at a position intermediate of its length, a piston rod extending into said cylinder and having a head thereon movable in said cylinder to pass said abutment, a piston at one side of said abutment movable independently of the rod and in fluid-tight contact with said cylinder to form an expansion chamber therein, said cylinder having a fluid connection at an end beyond the piston from the abutment and a port opening to the abutment when the piston is abutting it, and said piston being shaped to axially abut said head and said abutment.

27. The combination of a hydraulic position-locking device and a control valve therefor in which:

the hydraulic position-locking device includes a cylinder with an internal abutment intermediate its ends and with ports at said intermediate abutment and at both ends, a pison rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and the control valve has two ports normally in communication with one another, the first of said ports being connected to both of the end ports of said cylinder and the other being connected to the abutment port of said cylinder, a third valve port for supply of pressure medium to the valve, and a plunger in the valve positioned to be exposed to pressure from the third port and movable in response to said pressure to isolate the first port from said other port and to open communication from the third port to the first port.

28. The combination of a hydraulic position-locking device and a control valve therefor in which:

the hydraulic position-locking device includes a cylinder with an internal abutment intermediate its ends and with ports at said intermediate abutment and at both ends, a pison rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and the control valve has two ports normally in communication with one another, the first of said ports being connected to both of the end ports of said cylinder and the other being connected to a reservoir, a third valve port for supply of pressure medium to the valve, and a plunger in the valve positioned to be exposed to pressure from the third port and movable in response to said pressure to isolate the first port from said other port and to open communication from the third port to the first port.

29. In a vehicle having source means for supplying hydraulic fluid under pressure, a rigid front axle member, a rigid rear axle member, dirigible wheels mounted on the ends of said members, and hydraulic cylinder means connected to a relatively fixed member and to the two dirigible wheels at one end for steering, the improvement comprising:

a hydraulic lock device connected between a relatively fixed member and the other of the dirigible wheels; a track rod device interconnecting the said other dirigible wheels; front to rear tie rod means directly interconnecting the front and rear dirigible wheels; front to rear tie rod means inversely interconnecting the front and rear dirigible wheels; each of said means including a hydraulic lock device; said lock devices being adapted to alternatively float in length and to be predeterminedly fixed in length depending on the application of hydraulic fluid thereto; a control device connected to said source means and to said lock devices to alternatively lock any one of the lock devices and permit the remaining two to move freely, whereby a selection may be made of one of: two-wheel steering, normal four-wheel steering and "crab" four-wheel steering;

and steering means including a control device connected to said source means and to said hydraulic cylinders to supply hydraulic fluid to said first cylinder means selectively at all times in response to a steering command;

each hydraulic lock device including a cylinder with an internal abutment intermediate its ends and with ports at said intermediate abutment and at both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder;

and a control valve for each hydraulic lock device having two ports normally in communication with one another, the first of said ports being connected to both of the end ports of said cylinder and the other being connected to the abutment port of said cylinder, a third valve port for supply of pressure medium to the valve, and a plunger in the valve positioned to be exposed to pressure from the third port and movable in response to said pressure to isolate the first port from said other port and to open communication from the third port to the first port.

30. In a vehicle having source means for supplying hydraulic fluid under pressure, a rigid front axle member, a rigid rear axle member, dirigible wheels mounted on the ends of said members, and hydraulic cylinder means connected to a relatively fixed member and to the two dirigible wheels at one end for steering, the improvement comprising:

a hydraulic lock device connected between a relatively fixed member and the other of the dirigible wheels; a track rod device interconnecting the said other dirigible wheels; front to rear tie rod means directly interconnecting the front and rear dirigible wheels; front to rear tie rod means inversely interconnecting the front and rear dirigible wheels; each of said means including a hydraulic lock device; said lock devices being adapted alternatively to float in length and to be predeterminedly fixed in length depending on the application of hydraulic fluid thereto; and steering means including a control device connected to said source means and to said hydraulic cylinders to supply hydraulic fluid to said first cylinder means at all times in response to a steering command;

each hydraulic lock device including a cylinder with an internal abutment intermediate its ends and with ports at said intermediate abutment and at both ends, a piston rod extending into the cylinder and having a head thereon adapted to pass said abutment, a piston encircling said rod and movable along it, having fluid-tight contact with said rod and said cylinder and abutting against the abutment when actuated by fluid pressure admitted to the port beyond said piston from the abutment, a free piston at the other side of said abutment and in fluid-tight contact with said cylinder to be actuated against said abutment when fluid pressure is admitted to the cylinder by the port beyond said free piston from the abutment, said pistons, when both abutting against said abutment, locking said head and the piston in a predetermined position with respect to said cylinder; and control valve means for selectively locking any one of the lock devices by connecting its end ports to a source of power while connecting the end ports of the other lock devices for relatively free flow whereby a selection may be made of one of: two-wheel steering, normal four-wheel steering and "crab" four-wheel steering.

References Cited

UNITED STATES PATENTS

| | | | |
|---|---|---|---|
| 738,732 | 9/1903 | Patterson | 137—625.24 |
| 950,464 | 2/1910 | Slough | 137—625.24 |
| 1,849,259 | 3/1932 | Walker | 137—625.24 |
| 2,115,950 | 5/1938 | Gurries et al. | 137—625.32 |
| 3,021,869 | 2/1962 | Ross | 137—625.24 |
| 3,219,061 | 11/1965 | Hunter | 137—625.24 |

BENJAMIN HERSH, *Primary Examiner.*

JOHN A. PEKAR, *Assistant Examiner.*

U.S. Cl. X.R.

91—61; 92—65; 137—625.24